United States Patent
Lennen (10) Patent No.: US 11,686,854 B2
(45) Date of Patent: *Jun. 27, 2023

(54) SYSTEM AND METHOD FOR IMPROVED GNSS SENSITIVITY VIA COMBINING ACQUISITION AND TRACK CORRELATION HYPOTHESES

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd

( * ) Notice: Subject to any disclaimer, the term of this patent is extended or adjusted under 35 U.S.C. 154(b) by 149 days.

This patent is subject to a terminal disclaimer.

(21) Appl. No.: 17/191,171

(22) Filed: Mar. 3, 2021

(65) Prior Publication Data

US 2021/0190965 A1   Jun. 24, 2021

Related U.S. Application Data

(63) Continuation of application No. 15/879,012, filed on Jan. 24, 2018, now Pat. No. 10,942,279.

(60) Provisional application No. 62/576,781, filed on Oct. 25, 2017.

(51) Int. Cl.
  *G01S 19/29* (2010.01)
  *G01S 19/24* (2010.01)
  *G01S 19/00* (2010.01)

(52) U.S. Cl.
  CPC .............. *G01S 19/29* (2013.01); *G01S 19/24* (2013.01); *G01S 19/246* (2013.01)

(58) Field of Classification Search
  None
  See application file for complete search history.

(56) References Cited

U.S. PATENT DOCUMENTS

| 5,737,237 A | 4/1998 | Tanaka |
| 6,195,328 B1 | 2/2001 | Tsui et al. |
| 7,421,011 B2 | 9/2008 | Pietilä et al. |

(Continued)

FOREIGN PATENT DOCUMENTS

| EP | 2 811 320 | 12/2014 |
| KR | 10-1440692 | 9/2014 |

OTHER PUBLICATIONS

Borio, D., Lachapelle, G. A non-coherent architecture for GNSS digital tracking loops. Ann. Telecommun. 64, 601 (2009). https://doi.org/10.1007/s12243-009-0114-1; published on May 29, 2009. (Year: 2009).*

(Continued)

*Primary Examiner* — Bernarr E Gregory
(74) *Attorney, Agent, or Firm* — The Farrell Law Firm, P.C.

(57) ABSTRACT

An apparatus, a method, a method of manufacturing an apparatus, and a method of constructing an integrated circuit are provided. The apparatus includes a memory; and a processor configured to acquire K values with N peaks, where K and N are integers; select J of the N peaks and include the J peaks in track, where J is an integer less than or equal to N; determine a metric using acquisition non-coherent summations (NCSs) and track NCSs of coherent correlations; determine to not abandon the measurement based on the metric; and form a measurement responsive to determining to not abandon.

20 Claims, 6 Drawing Sheets

(56) References Cited

U.S. PATENT DOCUMENTS

| | | |
|---|---|---|
| 7,486,749 B2 | 2/2009 | Pietilä et al. |
| 7,639,181 B2 | 12/2009 | Wang et al. |
| 8,054,221 B1 | 11/2011 | Luong et al. |
| 8,243,776 B2 | 8/2012 | Tanaka et al. |
| 8,462,831 B2 | 6/2013 | Sturza et al. |
| 8,775,998 B2 | 7/2014 | Morimoto et al. |
| 8,810,449 B2 | 8/2014 | Aibara |
| 10,942,279 B2 * | 3/2021 | Lennen .................. G01S 19/24 |
| 2009/0323780 A1 | 12/2009 | Lennen |
| 2010/0134354 A1 | 6/2010 | Lennen |
| 2011/0037650 A1 | 2/2011 | Lennen |
| 2011/0103432 A1 | 5/2011 | Tangudu |
| 2012/0313817 A1 | 12/2012 | Underbrink |
| 2013/0034123 A1 | 2/2013 | Jarvis |
| 2018/0356531 A1 | 12/2018 | Naveen |

OTHER PUBLICATIONS

The Key Technology Research of High Sensitivity GPS Receiver, Jul. 15, 2017, 54 pages.
A. Sicramaz Ayaz et al., "Time-Frequency Based Intentional Interference Suppression Techniques in GNSS Receivers", Sep. 2012, 7 pages.
KR Notice of Allowance dated Mar. 17, 2023 issued in counterpart application No. 10-2018-0091285, 7 pages.
Chinese Office Action dated Feb. 28, 2023 issued in counterpart application No. 201811050261.9, 9 pages.

* cited by examiner

SYSTEM AND METHOD FOR IMPROVED GNSS SENSITIVITY VIA COMBINING ACQUISITION AND TRACK CORRELATION HYPOTHESES

PRIORITY

This application is a continuation of U.S. patent application Ser. No. 15/879,012, which was filed in the U.S. Patent and Trademark Office (USPTO) on Jan. 24, 2018, now U.S. Pat. No. 10,942,279, and claims priority under 35 U.S.C. § 119(e) to a U.S. Provisional Patent Application Ser. No. 62/576,781, which was filed in the USPTO on Oct. 25, 2017, the entire content of each of which is incorporated herein by reference.

FIELD

The present disclosure relates generally to a Global Navigation Satellite System (GNSS) receiver, and more particularly, to a system and a method for improved GNSS sensitivity, speed, and quality of available measurements.

BACKGROUND

Modern GNSS receiver performance is aided by injecting fine time and frequency into the receiver to narrow code phase and carrier frequency uncertainty in the receiver. Such aiding information can reduce the number of signal hypotheses tested from a range of tens of thousands to hundreds. The aiding information has been built into various standards such that modern Code Division Multiple Access (CDMA) and Long-Term Evolution (LTE) networks may supply a receiver with accurate time (e.g. 10 µsecs), and accurate frequency (e.g. +0.1 ppm, approximately ±160 Hz for GNSS). This is done largely by a call processor (CP) measuring a local temperature compensated crystal oscillator (TCXO) against a clock of a base station of a cell.

A typical receiver has an acquisition phase where a search of a number of code phase and carrier frequency hypotheses is performed and the best energy is selected for track. Track is a mode that assumes a presence of signal energy within a narrow operating range (e.g., within ±1 chip code phase and within ±10 Hz of carrier frequency). To track indicates to keep an incoming signal's energy and local replica's aligned such that as the incoming signal's parameters change the local replica is able to follow. In general, track is done by measuring a difference between two signals and feeding back corrections to a local replica to maintain alignment. In the case of fine aiding availability, multiple hypotheses (e.g. several hundred) may be integrated for an integration time (e.g. 5 seconds) and the hypotheses with the highest energy put into a track phase (indicating that code and carrier tracking loops are closed). For example, integration is performed on each hypothesis during acquisition with 20 milliseconds of coherent integration followed by non-coherent accumulation of the coherent summation across 5 seconds. Typically, when an acquisition hypothesis is put into track, the effective integration is restarted.

SUMMARY

According to one embodiment, an apparatus includes a memory; and a processor configured to acquire K values with N peaks, where K and N are integers; select J of the N peaks and include the J peaks in track, where J is an integer less than or equal to N; determine a metric using acquisition non-coherent summations (NCSs) and track NCSs of coherent correlations; determine to not abandon the measurement based on the metric; and form a measurement responsive to determining to not abandon.

According to one embodiment, a method includes acquiring, by a processor, K values with N peaks, where K and N are integers; selecting J of the N peaks and including the J peaks in track, where J is an integer less than or equal to N; determining a metric using acquisition non-coherent summations (NCSs) and track NCSs of coherent correlations; determining to not abandon the measurement based on the metric; and forming a measurement responsive to determining to not abandon.

According to one embodiment, a method of manufacturing an apparatus includes forming the apparatus on a wafer or a package with at least one other apparatus, wherein the apparatus includes a memory and a processor configured to acquire K values with N peaks, where K and N are integers, select J of the N peaks and include the J peaks in track, where J is an integer less than or equal to N, determine a metric using acquisition and track non-coherent summations (NCSs) of coherent correlations; determine to not abandon the measurement based on the metric; and form a measurement responsive to determining to not abandon; and testing the apparatus, wherein testing the apparatus comprises testing the apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an apparatus that includes a memory and a processor configured to acquire K values with N peaks, where K and N are integers, select J of the N peaks and include the J peaks in track, where J is an integer less than or equal to N, determine a metric using acquisition and track non-coherent summations (NCSs) of coherent correlations; determine to not abandon the measurement based on the metric; and form a measurement responsive to determining to not abandon; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The present disclosure relates to GNSS receivers and, in particular, to a system and a method for improving sensitivity, speed, and quality of measurements available.

According to one embodiment, the present system combines acquisition hypotheses and track correlation hypotheses to improve the effective signal-to-noise ratio (SNR) going into receiver signal metrics. The present system and method puts multiple hypotheses from an acquisition phase into a track phase with the acquisition hypotheses being combined with accumulated track NCSs to improve the effective SNR available for receiver signal metrics available in track. The receiver signal metrics include, but are not limited to, signal energy check, lock detection, continuous wave (CW) detection, cross correlation detection, multipath detection, frequency side lobe detection, range measurement, and range rate measurement.

Figure 1:
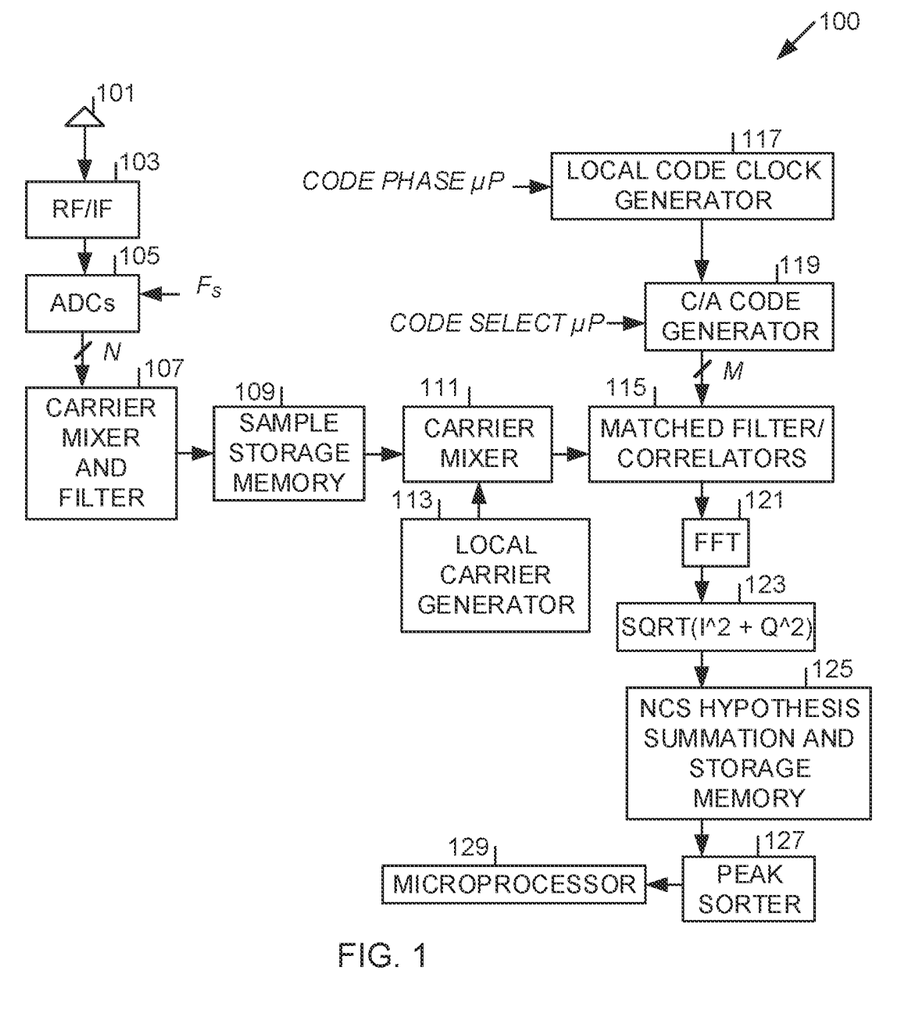
FIG. 1 is a block diagram of a GNSS receiver, according to one embodiment.

FIG. 1 is a GNSS receiver 100, according to one embodiment. Although the present system and method is described with respect to a Global Positioning System (GPS), the present system and method are not limited thereto but may be applied to all types of GNSS systems (e.g. GPS, Glonass, Galileo, Beidou, and augmentation systems).

Referring to FIG. 1, the GNSS receiver 100 includes an antenna 101, a radio frequency/intermediate frequency (RF/IF) device 103, an array of analog-to-digital converters 105, a carrier mixer and filter 107, a sample storage memory 109, a carrier mixer 111, a local carrier generator 113, an array of matched filter/correlators 115, a local code clock generator 117, a course (or clear)/acquisition (C/A) code generator 119, a Fast Fourier Transform (FFT) device 121, a square-root device 123, a non-coherent summation (NCS) hypothesis summation and storage memory 125, a peak sorter 127, and a microprocessor 129.

Typical hypothesis search parameters for weak signal acquisition and track include a time uncertainty range of approximately ±10 secs; a frequency uncertainty range of approximately ±160 Hz; a typical code hypothesis of ½ (or ¼) chip correlation separation and, therefore approximately 42 code hypotheses; a typical frequency hypothesis of 15 Hz and, therefore, approximately 22 carrier frequency hypotheses; a total number of hypothesis created of the number of code hypotheses times the number of carrier frequency hypotheses (e.g. 42×22=924); a typical coherent integration time of 20 msecs; a typical maximum NCS time of 5-8 seconds (where 8 seconds provides better performance); and a typical separate acquisition and track with 5 seconds NCS time provides a sensitivity of approximately −156 dBm, or 14 dB-Hz assuming a receiver sensitivity (SEN) of 4 dB.

A standards-based mobile station assisted (MSA) test requires a GNSS receiver to perform measurements on satellites and output those measurements within 20 seconds. The 20 seconds include acquisition, track, and measurement formation of weak signals (as well as other receiver functions including strong and medium signal strength searches).

Figure 2:
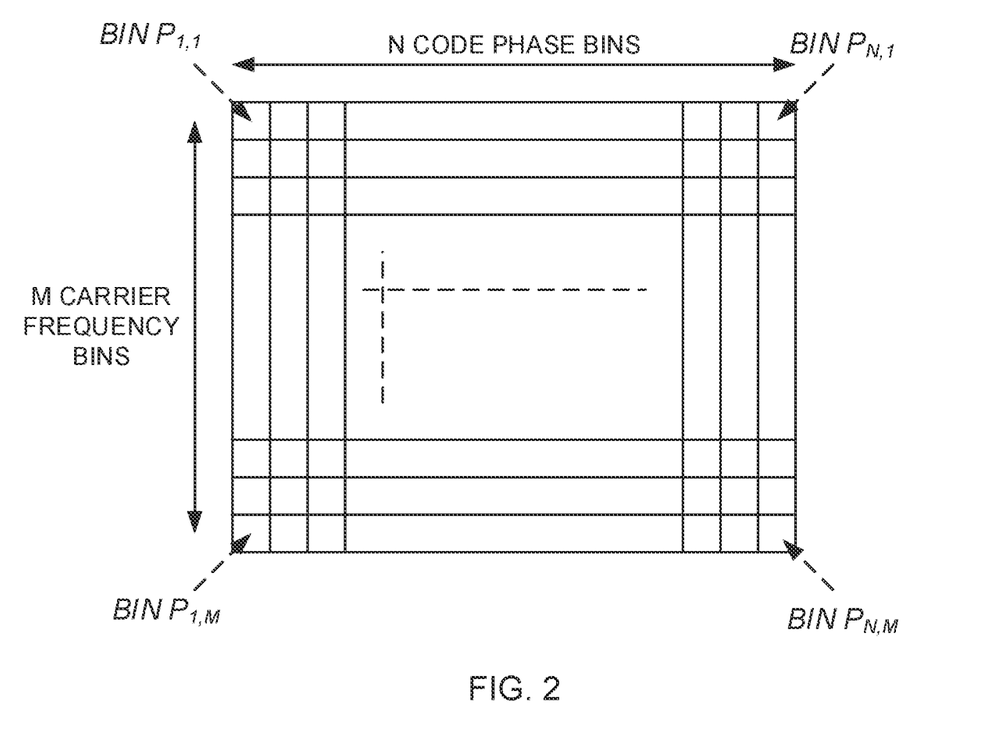
FIG. 2 is an illustration of an acquisition search space, according to one embodiment.

FIG. 2 is an illustration of an acquisition search space, according to one embodiment. The acquisition and search space may be in a form of N×M total hypotheses, where N and M are integers. The present system selects a top K values from the N×M acquisition hypotheses to potentially put in a track phase. The K values include, but are not limited to, 2, 4, 8, and 16.

Figure 3:
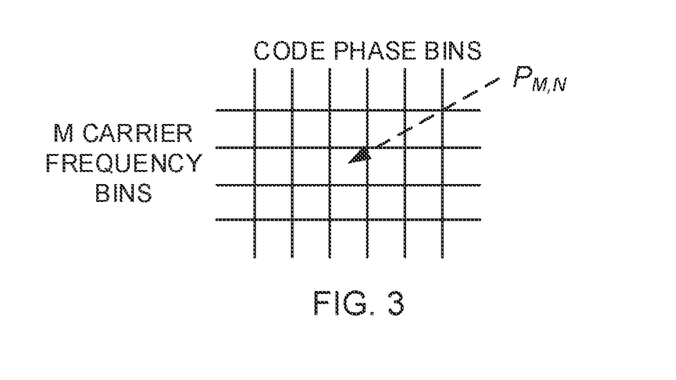
FIG. 3 is an illustration of an acquisition peak and adjacent correlators in code phase and carrier frequency domains, according to one embodiment.

Referring to FIG. 2, the present system provides peak selection to remove duplicate or near duplicate hypotheses. A near duplicate hypothesis is one that is close in terms of code phase and carrier frequency (e.g. within ½ chip in code phase and within 10 Hz in carrier frequency). The present system provides peak selection to select a set of J hypotheses from the K hypotheses. The set of J hypotheses has peaks $p_1$, $p_2$, ..., $p_N$, where $p_1$ is a maximum peak. In a fine time/frequency aiding case there is a high probability that the peak sort contains duplicates. The present system provides peak selection to remove duplicates where if any two peaks are within L Hz (e.g. 10 Hz) and R chips (e.g. ½ chip) then the present system only selects the peak with the highest p value for verification, where L and R are real numbers. As such, the set of J hypotheses with peaks sorted may be increased (e.g. from 4 to 8) to anticipate that duplicates and near duplicates may be rejected. The J values include, but are not limited to, 1, 2, 4, and 8 (J≤K). Each selected hypothesis includes adjacent code phase and carrier frequency bins. Adjacent bins are required to further compute track function and other receiver metrics. The bin values shown define the boundary of the two dimensional search space, N code phase bins times M carrier frequency bins. This is the entire search space in that if there is signal energy it must be present within this grid, this is because the mechanism by which the aiding is generated guarantees this. FIG. 3 described below is a subset of the search space shown in FIG. 2. Peak energy from FIG. 2 was found at location $P_{M,N}$ in FIG. 3. Note that because there is always noise present there is always uncertainty as to where the real peak is. The search bins in FIG. 2 are integer bins and in FIG. 3 interpolation may be used to provide a better estimate, a fractional bin estimate.

FIG. 3 is an illustration of an acquisition peak ($P_{m,n}$) and adjacent correlators in code phase and carrier frequency domains, according to one embodiment. The adjacent correlators may be used to interpolate in correlation delay and carrier frequency domains to estimate the peak code phase and carrier frequency from the acquisition correlations. Interpolated correlations may be identified as $P^*_{m,n}$.

Referring to FIG. 3, the $P_{m,n}$ and/or $P^*_{m,n}$ values are stored at the end of the acquisition process and thereafter used in combination with further track mode NCS to improve the SNR metric. NCSs created during track may be labelled $T_{m,n}$. Correlations developed during acquisition and track may be stored separately and summed when required to enhance metrics such as lock detect and CW detect. The metrics are typically a function of the NCS correlations, but may also be a function of coherent values as in metric=f(I, Q) where I and Q are 20 msec coherent summations.

For example, the present system may set up track channels for 2 top peaks found during acquisition. The present system closes the tracking loops (code+automatic frequency calibration (AFC)) on the 2 track channels. The correlators out of acquisition are stored as F±4, where F is a frequency, nominally 9 correlators in frequency domain, plus correlations in correlation time domain (¼ chip spaced E Hz and L Hz, where E and L are real numbers). In the two track channels the correlators $F_{\pm 4}$ are replicated (nominally 9 correlations at center frequency), including being separated by 15.625 Hz. The frequency domain correlators will be used via interpolation to provide a delta range measurement (similarly the correlation delay domain correlators are used via interpolation to provide a range measurement). The acquisition correlation hypothesis is accumulated with the equivalent track correlation hypothesis and used together before executing an impairment metric. For example, $F_{k\ total} = F_{k\ acq} + F_{k\ track}$. An impairment metric is an indicator or measurement of something that impairs an ability to receive a clean signal. For example, a large CW interferer will make it difficult to form GNSS measurements without a large error (the large error leading to bad position fixes). There are a number of events that can impair. Interference is one, multipath is another. In general, a receiver may take evasive or corrective action if there is some indication, for example, to use the measurement in the navigation solution if it is indicated as a CW or has too much multipath, or use it in the navigation solution with a corrected weighting.

Figure 4:
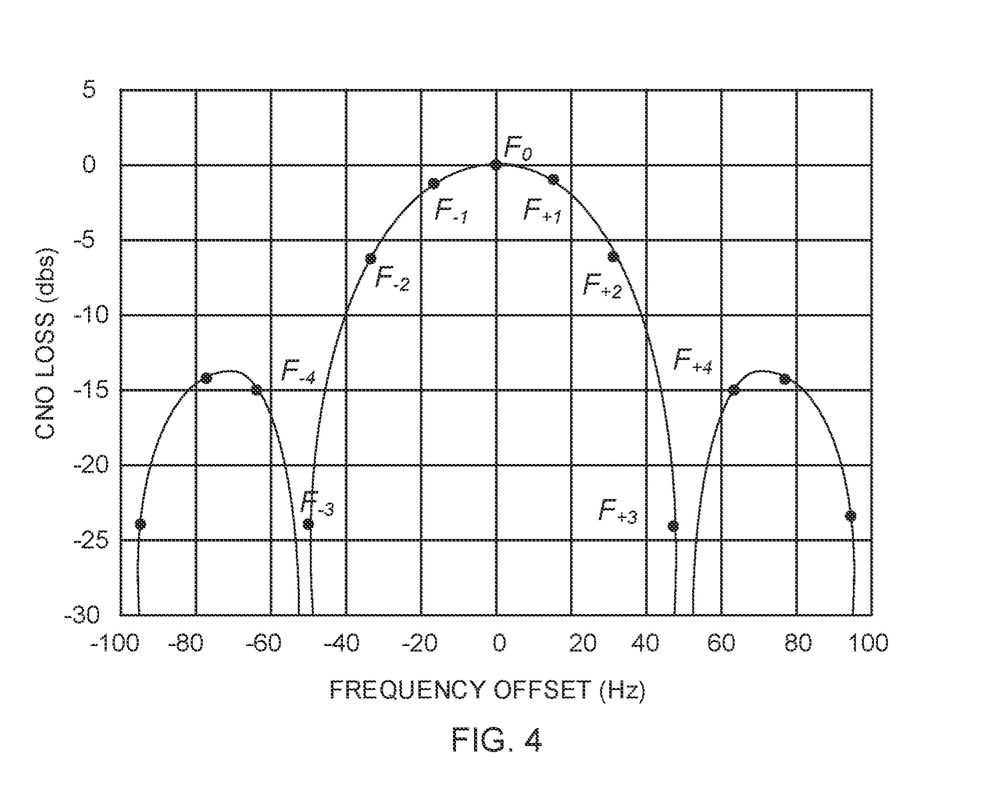
FIG. 4 is a chart of a waveform of acquisition/track frequency bins, according to one embodiment.

FIG. 4 is a chart of a waveform of acquisition/track frequency bins, according to one embodiment.

Referring to FIG. 4, the present system combines acquisition and track hypotheses to improve lock detection. A lock detector determines the presence or absence of a satellite signal. A power detector based on in-phase (I) and quadrature (Q) coherent correlations is used. Lock detection is formed by observing an estimated punctual correlation signal. A basic lock detect observation equation is given in Equation (1) as follows:

$$L_{Detect} = \Sigma_{1 \ldots K} \sqrt{(I_k^2 + Q_k^2)} \quad (1)$$

where $I_k$ and $Q_k$ are coherent correlations at time k. The non-coherent combination of $I_k$ and $Q_k$ is summed across K periods, where K is an integer.

A typical lock detect function is if ($T_{m,n} > n_{est} \times$threshold) then lock_detect=true, else lock_detect=false, where $n_{est}$ is a receiver's noise estimate commonly implemented in GNSS receivers.

According to one embodiment, the present system combines acquisition and track correlators to form I and Q on-frequency correlators, and then forms a lock detect. The present lock detect metric is updated as if ($[P_{m,n} + T_{m,n}] > n_{est} \times$ threshold) then lock_detect=true, else lock_detect=false. However, the threshold may need to be adjusted from the if ($P_{m,n}$>nest×threshold) case.

According to one embodiment, the present system combines acquisition and track hypotheses to improve CW detect. A CW detector determines whether a CW signal is present or not. A typical CW detect function is given in Equation (2) as follows:

if ($C_{punctual} < (CW_{threshold} * C_{offset})$)

CW_present_flag=true;

else

CW_present_flag=false; (2)

where CW_present_flag=true indicates that the measurement is not sent to the navigation solution. $C_{punctual}$ is the NCS summation across period K (K is from a set {0.16, 0.32, 0.64, 1.28, 2.56, 5.12} seconds in 0.16 second power of two mode, the other mode presented checks for CW detection every 0.16 seconds). The coherent integration period is 20 msecs. $C_{punctual}$ is the punctual code phase in the on-frequency bin.

$C_{offset}$ is the mean of M offset correlations, in the on-frequency bin.

Figure 5:
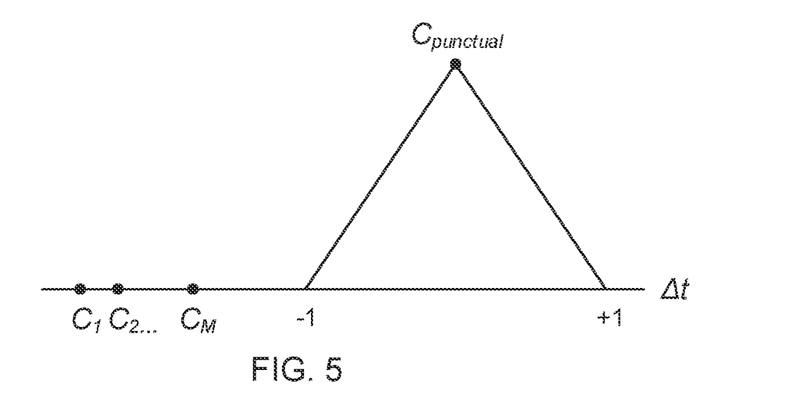
FIG. 5 is an illustration of an on-frequency bin correlator usage mode, according to one embodiment.

FIG. 5 is an illustration of an on-frequency bin correlator usage mode, according to one embodiment.

Referring to FIG. 5, each $C_m$ is an NCS summation across period K, coherent integration period 20 msecs. $C_1$ is an "earliest" correlator in a 16 tap window. $C_1, C_2, \ldots,$ and $C_M$ are ¼ chip spaced. M is equal to 6, and is the recommended number of correlators in the computation of $C_{offset}$.

According to one embodiment, the present system combines acquisition and track correlators such that $C_{punctual}$ and $C_m$ are based on combined acquisition and track correlators, where $C_{offset}$ is equal to a mean of $C_1, C_2, \ldots,$ and $C_M$.

According to one embodiment, the present system combines acquisition and track hypotheses to improve frequency side lobe detect. A frequency side lobe detector determines a difference between a lock to a main frequency lobe and a frequency side lobe. There is only one main lobe but there are many side lobe frequency lock possibilities. The frequency side lobe detector uses NCS sums in 5 available frequency bins that are labeled FFT1, FFT2, ..., FFT5. The frequency bins represent frequency offset versions of the punctual code phase tracking correlators. FFT3 is the on-frequency bin when a satellite is being tracked. Bins FFT2 and FFT4 are used in the AFC tracking loop.

A typical side lobe detect function is given in Equation (3) as follows:

if (abs(FFT1−FFT5)/FFT3>threshold)

side_lobe_lock_flag=true;

else side_lobe_lock_flag=false;  (3)

where FFT1, FFT3, and FFT5 are NCS summations across period K seconds (e.g. coherent integration period of 20 msecs).

According to one embodiment, the present system combines acquisition and track correlation hypotheses such that FFT1, FFT3, and FFT5 are NCS summations based on the combined acquisition and track correlators.

According to one embodiment, the present system combines acquisition and track correlation hypotheses for multipath mitigation.

According to one embodiment, the present system combines correlation hypotheses developed during an acquisition phase and track phase to improve range and range rate measurements. TCXO and Doppler frequency rate terms may be small. A TCXO frequency rate is measured by sampling a CP's measurement of it often (e.g. 1 Hz rate). Doppler frequency rate is expected to be smaller (max 1 Hz/sec vs. max 4 Hz/sec). LTE sends the Doppler rate as an aiding message. Limiting the unknown frequency rate allows the signals to remain relatively stationary during acquisition and track phases. NCS correlations are accumulated in code delay and carrier frequency domains across acquisition and track (e.g. 8+8=16 seconds). Interpolation is done across code phase and carrier frequency domains. For example, total NCS equals 7 (code) times 7 (carrier). According to one embodiment, the present system does not close tracking loops before a first measurement, and may close tracking loops at any time after the first measurement (i.e., early due to higher carrier-to-noise-density ratio (CNO) present).

Figure 6:
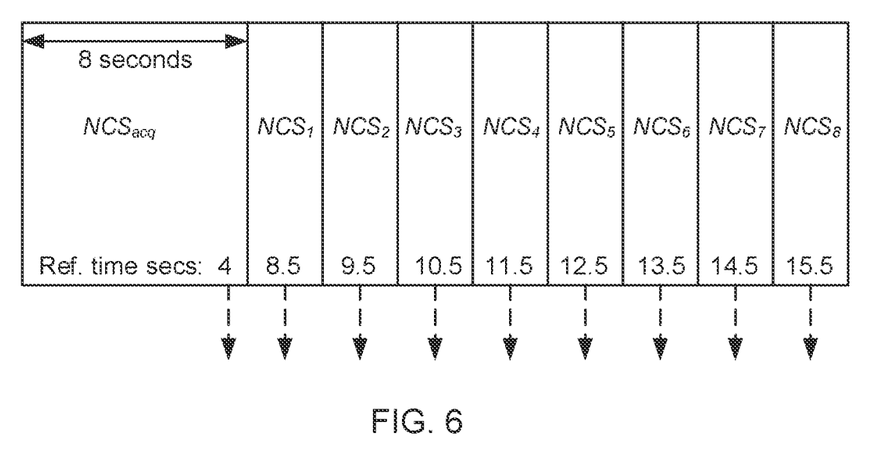
FIG. 6 is an illustration of non-coherent summation (NCS) propagation, according to one embodiment.

FIG. 6 is an illustration of NCS propagation, according to one embodiment.

Referring to FIG. 6, $NCS_{output} = NCS_{acq} \times (4.5\ RR_{acq}) + \Sigma_{k=1}^{7} NCS_k \times (1\ RR_k)$, and $range_{measurement} = peak_{interpolation}(NCS_{output})$, where RR is range rate estimate (either from network aiding or network aiding plus GNSS AFC loops). $RR_{acq}$ is a best estimate of range rate across 4.5 seconds between reference time of acquisition and reference time of $NCS_1$. $RR_k$ is best estimate of range rate across 1 second between reference time of last track second ($NCS_{k-1}$) and reference time of current track second ($NCS_k$).

NCS propagation allows the present system to combine all NCS summations across acquisition and track to improve measurement quality i.e., range measurement and range rate measurement.

Figure 7:
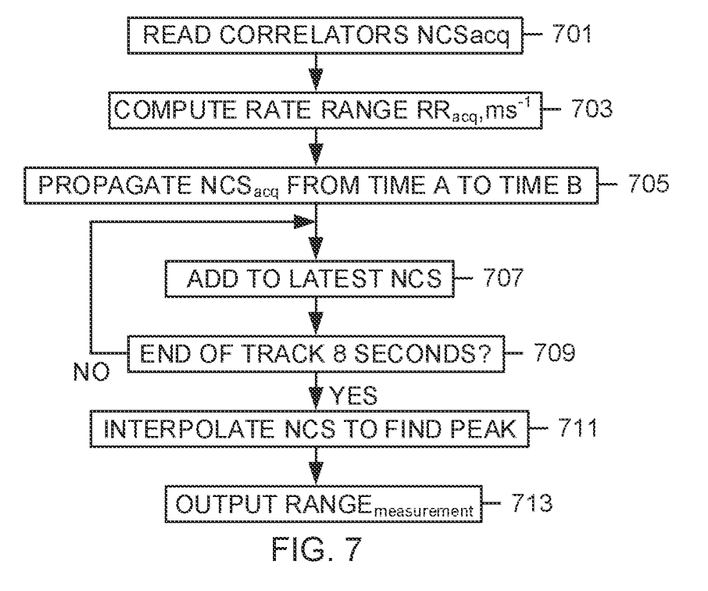
FIG. 7 is a flowchart of a method of NCS propagation, according to one embodiment.

FIG. 7 is a flowchart of a method of NCS propagation, according to one embodiment.

Referring to FIG. 7, the time sequence illustrated is relevant to the weakest signals, although at any time during acquisition and track, a measurement may be formed if a sufficiently strong signal is present. The weakest signals are typically in the range of −160 dBm to −156 dBm (10 to 14 dB-Hz), but may go significantly lower in the future with extended coherent integration (on pilot signals) and better medium term TCXO stabilities. Different satellites may be acquired and tracked at different times by a receiver, with different CNOs in each case.

At 701, NSC acquisition ($NCS_{acq}$) correlators are read.

At 703, an acquisition rate range ($RR_{acq}$) is computed.

At 705, $NCS_{acq}$ is propagated from time A to time B, where A and B are real numbers.

At 707, the propagated $NCS_{acq}$ is added to a latest NCS.

At 709, it is determined if a track of 8 seconds is ended. If not, the method returns to 707. Otherwise, the method proceeds to 711.

At 711, NCS is interpolated to find a peak.

At 713, a measurement of a range ($RANGE_{measurement}$) is output.

Figure 8:
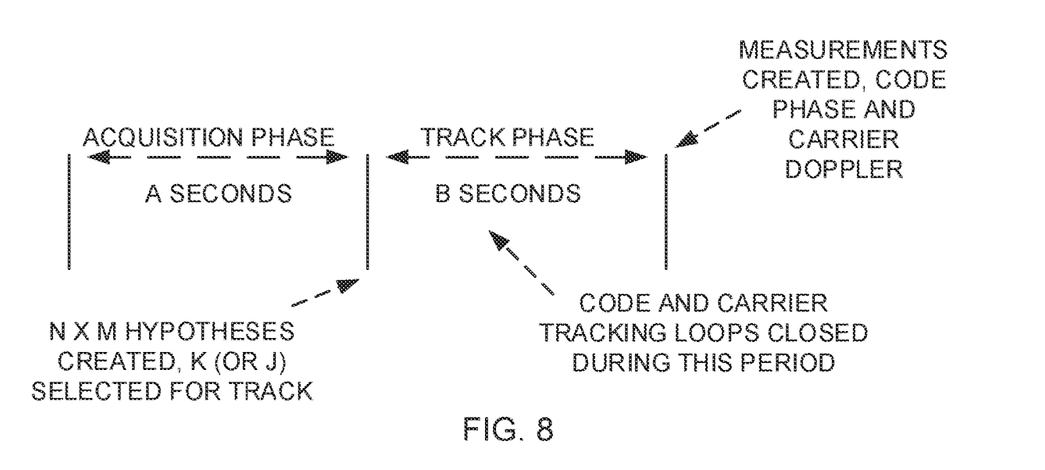
FIG. 8 is an illustration of an acquisition phase and a track phase timeline, according to one embodiment.

FIG. 8 is an illustration of an acquisition phase and a track phase timeline, according to one embodiment.

Referring to FIG. 8, A seconds and B seconds may be the same or different.

Figure 9:
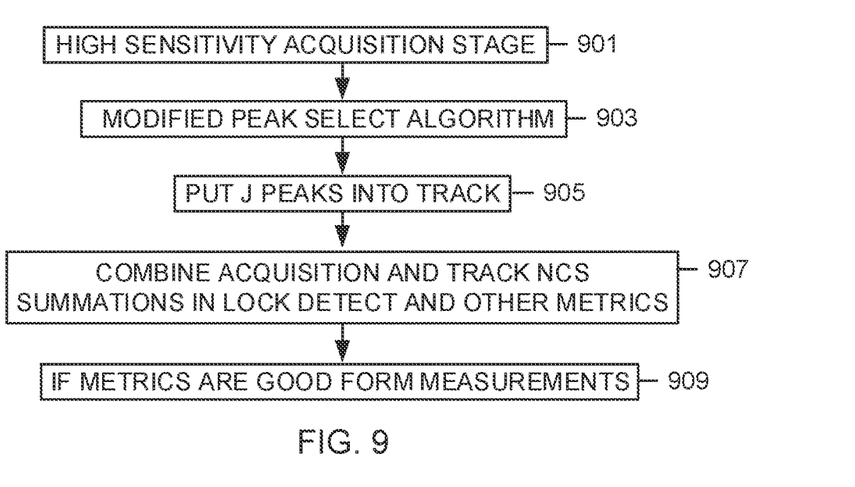
FIG. 9 is a flowchart of a method of acquisition and track processes, according to one embodiment.

FIG. 9 is a flowchart of a method of acquisition and track processes, according to one embodiment.

The following illustrates metric input SNR computations for various scenarios. In one scenario, −160 dBm=10 dB-Hz (4 dB receiver SEN).

Best SNR available at −156 dBm with track only 20 msec coherent and 5 seconds NCS integration: SNR=14 dB-Hz+ $10*\log_{10}(0.02)+5*\log_{10}(50\times 5)=14-17+12=9$ dB.

Combining acquisition and track with 5 secs NCS at −156 dBm: SNR=14 dB-Hz+$10*\log_{10}(0.02)+5*\log_{10}(2\times 50\times 5)=14-17+13.5=10.5$ dB.

Combining acquisition and track with 8 secs NCS at −156 dBm: SNR=14 dB-Hz+$10*\log_{10}(0.02)+5*\log_{10}(2\times 50\times 8)=14-17+14.5=11.5$ dB.

Combining acquisition and track with 8 secs NCS at −158 dBm: SNR=12 dB-Hz+$10*\log_{10}(0.02)+5*\log_{10}(2\times 50\times 8)=12-17+14.5=9.5$ dB, or SNR=9 dB at −158.5 dBm.

It is observed that −158 dBm should be possible for fine time/frequency adding MSA.

According to one embodiment, the present system and method improves GNSS sensitivity via combining of acquisition and track correlation hypotheses, including selecting a subset of acquisition hypotheses from a set of acquisition hypotheses during an acquisition phase. During a subsequent tracking phase, the present system provides tracking mode NCS using the subset of acquisition hypotheses from the acquisition phase with track hypotheses, where the combined acquisition and track NCS are used in various signal metrics such as signal energy check, lock detection, CW detection, cross correlation detection, multipath detection, frequency side lob detection, range measurement, and range rate measurement.

Referring to FIG. 9, high sensitivity acquisition is conducted at 901. K values of N peaks and code phase and frequency hypotheses are stored, where K and N are integers.

At 903, J peaks of the high sensitivity acquisition are selected, where J is an integer.

At 905, the J selected peaks are put into track.

At 907, acquisition and track NCS summations in metrics (e.g. lock detect and other metrics) are combined, resulting in more SNR available for metrics.

At 909, if the metrics are sufficient (e.g., good, the metrics do not indicate that the measurement should be abandoned), measurements are formed. A good range measurement is one that has low error as observed via the positioning and high level application. For example, in urban canyon navigation, 10 meters may be an acceptable position fix error. This indicates that the individual range measurements used in the position computation may have to be accurate on average to <3 meters. A good measurement is one that meets this specification. A range measurement derived from CW track may be off by many kilometers so identifying the track as CW (and the improved SNR helps) is beneficial.

Figure 10:
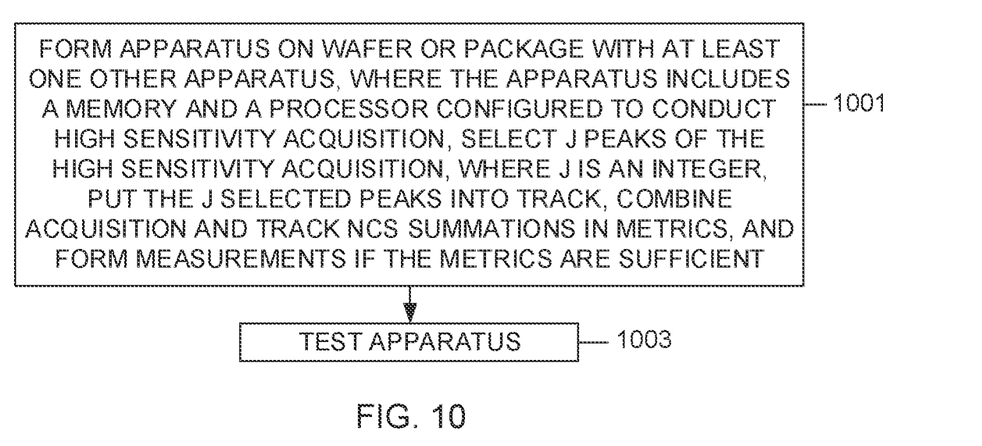
FIG. 10 is a flowchart of a method of manufacturing an apparatus, according to one embodiment.

FIG. 10 is a flowchart of a method of manufacturing an apparatus, according to one embodiment.

Referring to FIG. 10, an apparatus is formed on a wafer or a package with at least one other apparatus, where the apparatus includes a processor configured to conduct high sensitivity acquisition, select J peaks of the high sensitivity acquisition, where J is an integer, combine acquisition and track NCSs in metrics, and form measurements if the metrics are sufficient (e.g., the metrics do not indicate that the measurement should be abandoned), at 1001.

At 1003, the apparatus is tested. Testing the apparatus may include testing the apparatus using one or more electrical to optical converters, one or more optical splitters that split an optical signal into two or more optical signals, and one or more optical to electrical converters.

Figure 11:
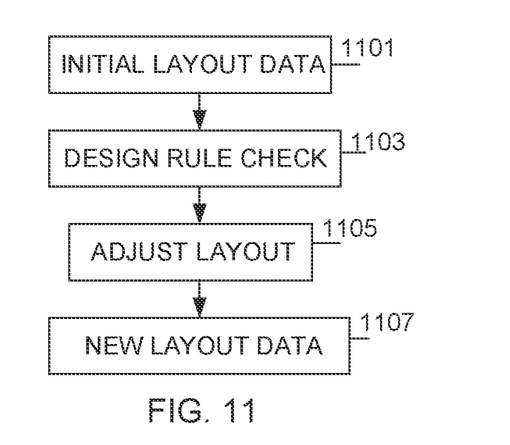
FIG. 11 is a flowchart of a method of constructing an integrated circuit, according to one embodiment.

FIG. 11 is a flowchart of a method of constructing an integrated circuit, according to one embodiment.

Referring to FIG. 11, initial layout data is constructed in 1101. For example, a mask layout is generated for a set of features for a layer of the integrated circuit, wherein the mask layout includes standard cell library macros for one or more circuit features that include an apparatus that includes a processor configured to conduct high sensitivity acquisition, select J peaks of the high sensitivity acquisition, where J is an integer, combine acquisition and track NCSs in metrics, and form measurements if the metrics are sufficient (e.g., the metrics do not indicate that the measurement should be abandoned). Relative positions of the macros may be disregarded for compliance to layout design rules during the generation of the mask layout.

At 1103, a design rule check is performed. For example, the method may check the relative positions of the macros for compliance with layout design rules after generating the mask layout.

At 1105, the layout is adjusted. For example, the method, upon detection of noncompliance with the layout design rules by any of the macros, may modify the mask layout by modifying each of the noncompliant macros to comply with the layout design rules.

At 1107, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a memory; and
   a processor configured to:
   acquire K values with N peaks, where K and N are integers;
   select J of the N peaks and include the J peaks in track, where J is an integer less than or equal to N;
   determine a metric using acquisition non-coherent summations (NCSs) and track NCSs of coherent correlations;
   determine to not abandon the measurement based on the metric; and
   form a measurement responsive to determining to not abandon.

2. The apparatus of claim 1, wherein the apparatus is one of a global navigation satellite system (GNSS) including a global positioning system (GPS), Glonass, Galileo, or Beidou, or an augmentation system.

3. The apparatus of claim 2, wherein the GNSS comprises:
   an antenna;
   a radio frequency/intermediate frequency (RF/IF) device connected to the antenna;
   an analog-to-digital converter (ADC) connected to the RF/IF device, including an input for receiving a frequency signal, and an output bus;
   a first carrier mixer and filter connected to the ADC;
   a sample storage memory connected to the first carrier mixer and filter;
   a local carrier generator;
   a second carrier mixer connected to the sample storage memory and the local carrier generator;
   a local code clock generator, including an input for receiving a code phase signal;
   a course/acquisition (C/A) code generator connected to the local code clock generator, including an input for receiving a code select signal, and an output bus;
   an array of matched filter/correlators connected to the second carrier mixer and the C/A code generator;
   a Fast Fourier Transform (FFT) device connected to the array of matched filter/correlators;
   a square root device connected to the FFT device;
   an NCS hypothesis summation and storage memory connected to the square root device;
   a peak sorter connected to the NCS hypothesis summation and storage memory; and
   a microprocessor connected to the peak sorter.

4. The apparatus of claim 1, wherein the N peaks are highest energy peaks.

5. The apparatus of claim 1, wherein the metric is one of a signal energy check, lock detection, continuous wave (CW) detection, cross correlation detection, multipath detection, frequency side lobe detection, range measurement, and range rate measurement.

6. The apparatus of claim 1, wherein the J peaks do not include duplicates or near duplicates.

7. The apparatus of claim 6, wherein the near duplicate is within ½ chip in code phase and within 10 Hz in carrier frequency.

8. The apparatus of claim 1, wherein each J peak includes adjacent correlators.

9. The apparatus of claim 8, wherein the processor is further configured to use the adjacent correlators to estimate peak code phase and carrier frequency from acquisition correlations.

10. A method, comprising:
   acquiring, by a processor, K values with N peaks, where K and N are integers;
   selecting J of the N peaks and including the J peaks in track, where J is an integer less than or equal to N;
   determining a metric using acquisition non-coherent summations (NCSs) and track NCSs of coherent correlations;
   determining to not abandon the measurement based on the metric; and
   forming a measurement responsive to determining to not abandon.

11. The method of claim 10, wherein the N peaks are highest energy peaks.

12. The method of claim 10, wherein the metric is one of a signal energy check, lock detection, continuous wave (CW) detection, cross correlation detection, multipath detection, frequency side lobe detection, range measurement, and range rate measurement.

13. The method of claim 10, wherein the J peaks do not include duplicates or near duplicates.

14. The method of claim 13, wherein the near duplicate is within ½ chip in code phase and within 10 Hz in carrier frequency.

15. The method of claim 10, wherein each J peak includes adjacent correlators.

16. The method of claim 15, wherein the adjacent correlators are used to estimate peak code phase and carrier frequency from acquisition correlations.

17. A method of manufacturing an apparatus, comprising:
   forming the apparatus on a wafer or a package with at least one other apparatus, wherein the apparatus comprises a memory and a processor configured to acquire K values with N peaks, where K and N are integers, select J of the N peaks and include the J peaks in track, where J is an integer less than or equal to N, determine a metric using acquisition and track non-coherent summations (NCSs) of coherent correlations; determine to not abandon the measurement based on the metric; and form a measurement responsive to determining to not abandon; and
   testing the apparatus, wherein testing the apparatus comprises testing the apparatus using one or more electrical to optical converters, one or more optical splitters that split an optical signal into two or more optical signals, and one or more optical to electrical converters.

18. The method of claim 17, wherein the metric is one of a signal energy check, lock detection, continuous wave (CW) detection, cross correlation detection, multipath detection, frequency side lobe detection, range measurement, and range rate measurement.

19. A method of constructing an integrated circuit, the method comprising:
   generating a mask layout for a set of features for a layer of the integrated circuit, wherein the mask layout includes standard cell library macros for one or more circuit features that include an apparatus comprising a memory and a processor configured to acquire K values with N peaks, where K and N are integers, select J of the N peaks and include the J peaks in track, where J is an integer less than or equal to N, determine a metric using acquisition and track non-coherent summations (NCSs) of coherent correlations; determine to not abandon the measurement based on the metric; and form a measurement responsive to determining to not abandon;
   disregarding relative positions of the macros for compliance to layout design rules during the generation of the mask layout;
   checking the relative positions of the macros for compliance to layout design rules after generating the mask layout;
   upon detection of noncompliance with the layout design rules by any of the macros, modifying the mask layout by modifying each of the noncompliant macros to comply with the layout design rules;
   generating a mask according to the modified mask layout with the set of features for the layer of the integrated circuit; and
   manufacturing the integrated circuit layer according to the mask.

20. The method of claim 19, wherein the metric is one of a signal energy check, lock detection, continuous wave (CW) detection, cross correlation detection, multipath detection, frequency side lobe detection, range measurement, and range rate measurement.

* * * * *